United States Patent
Bottger et al.

(10) Patent No.: US 11,726,952 B2
(45) Date of Patent: Aug. 15, 2023

(54) OPTIMIZATION OF RESOURCES PROVIDING PUBLIC CLOUD SERVICES BASED ON ADJUSTABLE INACTIVITY MONITOR AND INSTANCE ARCHIVER

(71) Applicant: Oracle International Corporation, Redwood Shores, CA (US)

(72) Inventors: Todd A. Bottger, Lehi, UT (US); Hochak Hung, San Carlos, CA (US); Kumar Rajamani, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 245 days.

(21) Appl. No.: 17/003,630

(22) Filed: Aug. 26, 2020

(65) Prior Publication Data
US 2021/0081355 A1    Mar. 18, 2021

Related U.S. Application Data

(60) Provisional application No. 62/900,145, filed on Sep. 13, 2019.

(51) Int. Cl.
G06F 16/20    (2019.01)
G06F 16/11    (2019.01)
H04L 67/1097  (2022.01)
G06F 16/16    (2019.01)
H04L 67/06    (2022.01)
H04L 67/01    (2022.01)

(52) U.S. Cl.
CPC .......... *G06F 16/113* (2019.01); *G06F 16/162* (2019.01); *H04L 67/1097* (2013.01); *H04L 67/01* (2022.05); *H04L 67/06* (2013.01)

(58) Field of Classification Search
CPC .. G06F 16/113; G06F 16/162; H04L 67/1097; H04L 67/01; H04L 67/06
See application file for complete search history.

(56) References Cited

U.S. PATENT DOCUMENTS

| | | |
|---|---|---|
| 6,502,102 B1 | 12/2002 | Haswell |
| 6,638,878 B2 | 10/2003 | Restaino |
| 6,973,647 B2 | 12/2005 | Crudele |
| 7,136,857 B2 | 11/2006 | Chen |
| 7,418,435 B1 | 8/2008 | Sedlar |
| 7,571,173 B2 | 8/2009 | Yang |

(Continued)

OTHER PUBLICATIONS

Shanthaveerappa, U.S. Appl. No. 15/244,867, filed Aug. 23, 2016, Notice of Allowance Nov. 5, 2019, dated Nov. 5, 2019.

(Continued)

*Primary Examiner* — Tarek Chbouki
(74) *Attorney, Agent, or Firm* — Hickman Becker Bingham Ledesma LLP

(57) ABSTRACT

Techniques described herein automatically check for persistently inactive instances, based on defined metrics, and auto-archive such instances to lower-cost cloud resources. An inactivity time threshold is dynamically adjustable to a longer or shorter time period based on current load running on limited/more expensive resources to more aggressively or less aggressively archive the inactive instances, thus enabling additional active instances to run on the limited/more expensive resources and supporting more total users.

18 Claims, 5 Drawing Sheets

(56) References Cited

U.S. PATENT DOCUMENTS

| | | |
|---|---|---|
| 7,620,623 B2 | 11/2009 | Sedlar |
| 8,061,085 B2 | 11/2011 | Anderson |
| 8,065,320 B2 | 11/2011 | Sedlar |
| 8,161,085 B2 | 4/2012 | Souder |
| 8,706,833 B1* | 4/2014 | Bergant ............... G06F 16/1756 709/215 |
| 9,280,591 B1 | 3/2016 | Kharatishvili |
| 9,298,564 B2 | 3/2016 | Lee |
| 9,396,220 B2 | 7/2016 | Li |
| 9,507,843 B1 | 11/2016 | Madhavarapu |
| 9,684,561 B1 | 6/2017 | Yan |
| 9,773,015 B2* | 9/2017 | Guo ....................... G06F 16/951 |
| 10,671,515 B1* | 6/2020 | Sanghvi ............. G06F 11/3688 |
| 2002/0112022 A1 | 8/2002 | Kazar |
| 2003/0050932 A1 | 3/2003 | Pace |
| 2003/0074360 A1 | 4/2003 | Chen |
| 2005/0154697 A1* | 7/2005 | Altaf ....................... G06F 16/27 |
| 2005/0256908 A1 | 11/2005 | Yang |
| 2005/0283478 A1 | 12/2005 | Choi |
| 2006/0047626 A1 | 3/2006 | Raheem |
| 2006/0047713 A1 | 3/2006 | Gornshtein |
| 2007/0083563 A1 | 4/2007 | Souder |
| 2007/0100912 A1 | 5/2007 | Pareek |
| 2010/0083243 A1* | 4/2010 | Mincarelli ................ G06F 8/61 717/173 |
| 2011/0307450 A1 | 12/2011 | Hahn |
| 2013/0262387 A1* | 10/2013 | Varadharajan ........ G06F 16/214 707/639 |
| 2015/0149993 A1* | 5/2015 | Pohlmann ................. G06F 8/63 717/174 |
| 2016/0188621 A1 | 6/2016 | Karinta et al. |
| 2016/0210342 A1* | 7/2016 | Vallabhaneni ........ G06F 3/0643 |
| 2017/0315877 A1 | 11/2017 | Kaplingat |
| 2018/0007128 A1* | 1/2018 | Ramachandra ..... H04L 41/5009 |
| 2018/0060177 A1 | 3/2018 | Shanthaveerappa |
| 2018/0060181 A1* | 3/2018 | Rajamani ............ G06F 11/1469 |
| 2018/0077196 A1* | 3/2018 | Itikarlapalli .......... H04L 63/102 |
| 2019/0132211 A1* | 5/2019 | Yeung ..................... H04L 67/10 |
| 2020/0356542 A1* | 11/2020 | Carroll .............. G06F 16/24578 |

OTHER PUBLICATIONS

Shanthaveerappa, U.S. Appl. No. 15/244,867, filed Aug. 23, 2016, Office Action, dated Jun. 28, 2018.

Shanthaveerappa, U.S. Appl. No. 15/244,867, filed Aug. 23, 2016, Notice of Allowance, dated Nov. 5, 2019.

Shanthaveerappa, U.S. Appl. No. 15/244,867, filed Aug. 23, 2016, Notice of Allowance, dated Apr. 4, 2019.

Shanthaveerappa, U.S. Appl. No. 15/244,867, filed Aug. 23, 2016, Interview Summary, dated Mar. 14, 2019.

Shanthaveerappa, U.S. Appl. No. 15/244,867, filed Aug. 23, 2016, Final Office Action, dated Jan. 24, 2019.

Shanthaveerappa, U.S. Appl. No. 15/244,867, filed Aug. 23, 2016, Interview Summary, dated Oct. 30, 2018.

Rajamani, U.S. Appl. No. 15/254,884, filed Sep. 1, 2016, Office Action, dated Jun. 27, 2018.

Rajamani, U.S. Appl. No. 15/254,884, filed Sep. 1, 2016, Notice of Allowance, dated Nov. 20, 2019.

Rajamani, U.S. Appl. No. 15/254,884, filed Sep. 1, 2016, Notice of Allowance, dated Jun. 24, 2020.

Rajamani, U.S. Appl. No. 15/254,884, filed Sep. 1, 2016, Interview Summary, dated Jan. 10, 2019.

Rajamani, U.S. Appl. No. 15/254,884, filed Sep. 1, 2016, Interview Summary, dated Sep. 24, 2018.

Rajamani, U.S. Appl. No. 15/254,884, filed Sep. 1, 2016, Final Office Action, dated Nov. 21, 2018.

Sata's DBA Blog: "Oracle Statistics", dated Jan. 3, 2013, http://satya-dba.blogspot.com/2010/06/oracle-database-statistics-rbo-cbo.html, 14 pages.

* cited by examiner

OPTIMIZATION OF RESOURCES PROVIDING PUBLIC CLOUD SERVICES BASED ON ADJUSTABLE INACTIVITY MONITOR AND INSTANCE ARCHIVER

BENEFIT CLAIM

This application claims the benefit under 35 U.S.C. 119(e) of provisional application 62/900,145, filed Sep. 13, 2019, entitled "Optimization of Resources Providing Public Cloud Services Based on Adjustable Inactivity Monitor and Instance Archiver," the entire contents of which are hereby incorporated by reference as if fully set forth herein.

FIELD OF THE INVENTION

The present disclosure relates to the field of cloud services. For instance, the disclosed techniques provide optimization of resource providing public cloud services based on adjustable inactivity monitor and instance archiver.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cloud computing is a model for sharing resources over the Internet and enabling access by cloud users to resources, such as data storage, software, and processing. These resources may be limited or have expensive hardware and/or software. Since user load is dynamic, with rapidly increasing, decreasing, and idle usage, cloud providers need to optimally schedule resources. Cloud service providers must address variable demands while guaranteeing a certain level of service to cloud users, all the while without overprovisioning.

One solution to service a large number of cloud users and their corresponding service instances is to scale up to support more users/instances by adding more hardware and software resources to the cloud environment. Another solution is to upgrade existing on-premises hardware and software resources. Although scaling out and scaling up may be viable solutions, these solutions are associated with massive costs. In addition, these solutions do not address overprovisioning.

Therefore, there is a need to enable limited or expensive hardware and/or software resources to service a greater number of cloud users and instances without requiring the purchase of additional resources or expensive upgrades of the current resources and without impacting the core functionality or overall performance of such services.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

DETAILED DESCRIPTION

Figure 1:
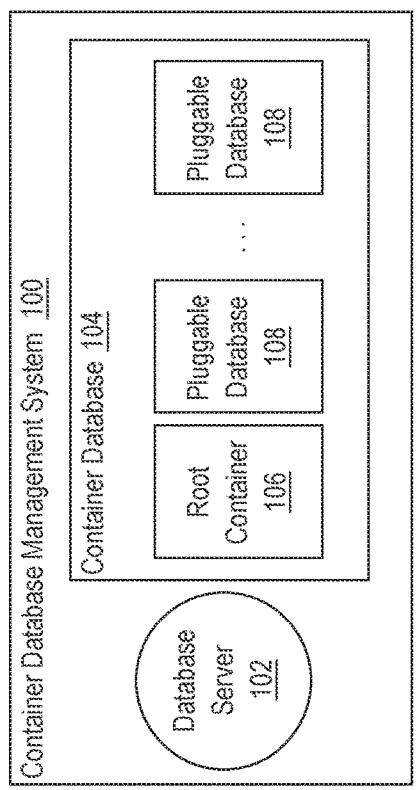
FIG. 1 illustrates a diagram of a container DBMS according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Live cloud database instances ("cloud instances") running on a cloud environment are periodically monitored to determine whether they are active. A metric for determining whether a cloud instance is active or not is by checking whether there has been an inbound user connection to the instance within a time period (e.g., last X days). If the instance is determined to be inactive, then the instance is automatically removed from the cloud environment and archived to lower cost cloud resources while preserving its data and most or all of its runtime state. As the cloud environment experiences unplanned peaks and troughs in instance creation rate over time, a time threshold (e.g., X days) may be adjusted to a longer or shorter period to more aggressively or less aggressively archive inactive instances, thus optimizing available resources on the cloud environment and accommodating more live instances and total users. End users may bring back an archived instance, which will once again made live, via a user-initiated action. End users may also be provided with notifications, such as in the form of messages and UI alerts. Advanced notifications may be generated before any auto-archive action and/or any auto-delete action are taken. Completion notifications may be generated after successful actions, such as when an instance has been archived, deleted, or unarchived.

Techniques described herein thus provide the maximum service to the largest set of prospective users by searching for persistently inactive cloud instances and automatically archiving them to lower cost resources. Automatically archiving inactive cloud instances frees up limited or expensive resources for additional active instances to run without upgrading existing resources and without adding more resources to cloud environment.

Container Database and Pluggable Databases

In an embodiment, cloud instances are used using a database technology referred to herein as "container database" (CDB). A CDB may contain one or more pluggable databases (PDBs). The CDB may be shared by multiple tenants that may or may not share various PDBs that are hosted by the CDB. The CDB contains one root container that stores schemas, schema objects, and non-schema objects to which all PDBs belong. Each PDB is a user-created entity that contains data and code required for a specific set of features. For example, a PDB may support a specific application, such as a human resources or sales application.

A CDB includes a data dictionary, which comprises metadata that defines database objects in the CDB. For example, the data dictionary for a given CDB will include metadata describing each PDB that is contained in the given CDB, including the database objects included in each PDB. Further, each PDB includes a PDB-specific database dictionary that comprises metadata that defines database objects contained in the PDB. Database objects include tables, table columns, indexes, files, tablespaces, data types, users, user privileges, and storage structures used for storing database object data, etc.

A given database server instance may manage and serve PDBs contained within a CDB. As such, a given CDB allows multiple PDBs to hosted on the same database server and/or database server instance, allowing the computing resources of a single database server or instance to be shared between multiple PDBs.

In a container database management system (CDBMS), each pluggable database may be open or closed in a CDB, independently from other PDBs in the CDB. PDBs may be "plugged in" to a CDB, and may be transported between database servers and/or DBMSs. The CDBMS may manage multiple PDBs and a given database server instance may serve those PDBs from the CDB. As such, a given CDB allows multiple PDBs to run on the same database server and/or database server instance, allowing the computing resources of a single database server or instance to be shared between multiple PDBs.

A PDB may be an independent database that may be moved or copied from one CDB to another. A PDB may contain a schema of related tables, such as defined by data definition language (DDL), and their records.

An application may access a pluggable database by establishing a database session on a CDBMS for a PDB, where a database session represents the connection between an application and the CDBMS for accessing the PDB. A database session may be initiated for a PDB by, for example, transmitting a request for a new connection to a CDBMS, the request specifying the PDB. A container DBMS may host multiple database sessions, each database session being for one of multiple PDBs contained in the CDBMS.

A PDB may detached or "unplugged" from a host CDB. Unplugging a PDB from a host CDB may generate a "PDB descriptor" file that contains information about the names and full paths of tablespaces. The PDB descriptor file may be formatted according to XML or JSON for example. The PDB descriptor contains all required information to allow the PDB to subsequently "plug" into the same or different CDB.

The PDB descriptor and all data files for the unplugged PDB may be combined into an archive file. Data files that contain the contents of the unplugged PDB, including schema, tables, and records are written into the archive file. An archive file may be a tar file, a compressed file, or an archive of any format that aggregates multiple files into one file, such as a library file. Examples of archive files for pluggable databases and unplugging and plugging in such archive files are described in (1) U.S. patent application Ser. No. 15/244,867, Pluggable Database Archive, filed on Aug. 23, 2016 by Prashanth Shanthaveerappa, et al., the entire contents of which are incorporated herein by reference, and (2) U.S. patent application Ser. No. 15/254,884, Transportable Backups for Pluggable Database Relocation, filed on Sep. 1, 2016 by Kumar Rajamani, et al., the entire contents of which are incorporated herein by reference.

An archive file may be exported from a CDB. An archive file may also be imported into the same or a different CDB to configure an existing or new PDB to be a copy of another PDB.

FIG. 1 illustrates a diagram of a container DBMS according to an embodiment of the present invention. Container DBMS (CDBMS) 100 comprises a database server 102 and a container database (CDB) 104. The database server 102 may be a relational database management system (RDMBS) or database software instance that is capable of hosting the CDB 104. The CDB 104 contains a root container 106 and multiple pluggable databases (PDBs) 108. The database server 102 manages the CDB 104 and the PDBs 108 contained in the CDB 104. Although one CDB is illustrated in FIG. 1 for clarity, it is noted that the CDBMS 100 may comprise multiple CDBs and that an instance of the database server 102 manages one of the multiple CDBs.

The database server 102 represents a combination of software and resources on one or more computer systems that manage CDB 104. An example of a database server and computer system upon which a database server may run is described below in the section DATABASE OVERVIEW, although an embodiment of the present invention is not so limited. Although FIG. 1 only depicts a particular number of each element, an embodiment may have many more of each of the elements illustrated in FIG. 1.

Topology of the PDBs 108 is hidden from end users. An end user may use a PDB 108 without knowledge of which data center, computer, and container database actually hosts the PDB 108.

PDB as a Service

As discussed above, a pluggable database (PDB) is portable set of schemas, schema objects, and related structures that appears logically to an application as a separate database. This self-contained collection is called a PDB. A container is a collection of schemas, objects, and related structures in a container database (CDB) that appears logically to an application as a separate database. A CDB is a database that includes zero, one, or many PDBs.

A set of CDBs may be used for pluggable database as a service (PDBaaS). The set of CDBs form a database pool that end users can draw from. In an embodiment, all CDBs in the database pool may be of the same version and platform. In an embodiment, all CDBs in the database pool may run on the Oracle Exadata platform.

Exadata is a computing platform optimized for running databases. Exadata is a combined hardware and software platform that includes database servers and storage servers connected by an extremely high speed internal fabric that connects all servers and storage. In an embodiment, Exadata also includes artificial intelligence and machine learning capabilities to move data within and/or outside the platform.

Any limited or expensive cloud resource, such as Exadata storage, that is provisioned is wasted when it is left consistently and persistently fallow. To provide the maximum service to the largest set of prospective users, techniques described herein search for persistently inactive cloud instances and automatically archive them to lower cost resources, along with a user option to unarchive and run such instances on their original environment(s) again as needed. Automatically archiving inactive cloud instances frees up limited or expensive resources for additional active instances to run without upgrading existing resources and without adding more resources to cloud environment.

Cloud Environment Example

Figure 2:
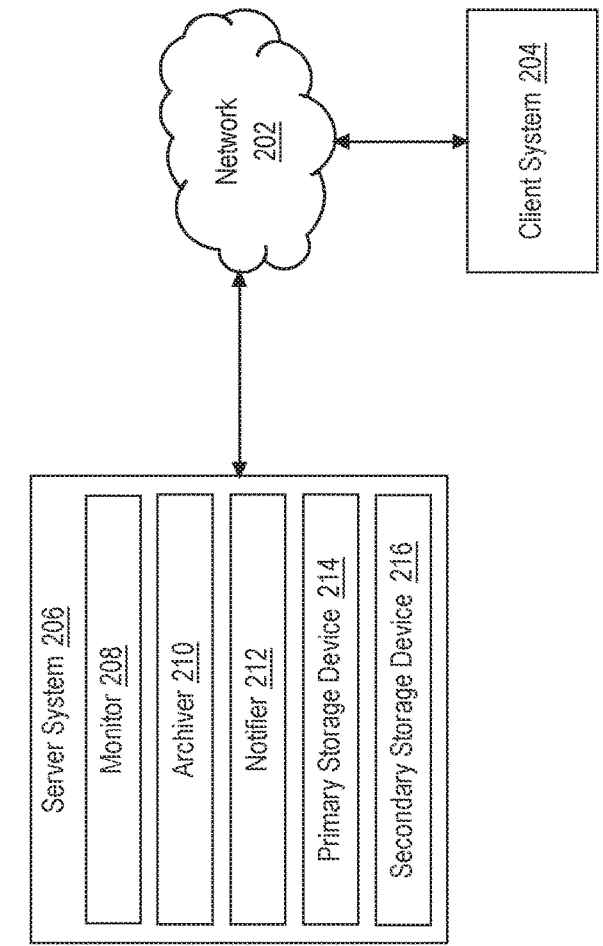
FIG. 2 illustrates a diagram of a cloud environment according to an embodiment of the present invention.

FIG. 2 illustrates a diagram of a cloud environment according to an embodiment of the present invention. Cloud environment 200 may include a client system 204 that is connected, via a network 202, to a server system 206 that provides a cloud service, such as PDBaaS. Client system 204 may be a physical computer system or a virtual machine that is configured to access the cloud service.

In an embodiment, the CDMS 100 of FIG. 1 run on the server system 206. In an embodiment, the server system 206 may include a monitor 208, an archiver 210, and a notifier 212. Monitor 208 includes one or more computer system processes executing monitoring instructions configured to monitor PDBs and to search for persistently inactive instances. Monitoring instructions may also be configured to monitor CDB load (e.g., number of PDBs) and to automatically adjust applicable time periods or thresholds based on the CDB load.

Archiver 210 includes one or more computer system processes executing archiving/unarchiving instructions configured to archive or hibernate instances to lower cost resources and to unarchive and run such instances on their original environments again. Archiver 210 may also include deleting instructions to delete archive files.

Notifier 212 includes one or more computer system processes executing notification instructions configured to provide end users with multiple advanced notifications and completion notification, such as in the form of messages and UI alerts on client system 204, before and after any action is taken.

Server system 206 also includes a multi-tiered storage system. In an embodiment, the multi-tiered storage system includes a primary or tier-one storage device 214 and a secondary or tier-two storage device 216 that is less expensive storage than the primary or tier-one storage device 214. In an embodiment, the primary or tier-one storage device 214 is configured to be the highest performing platform for running Oracle database and/or CDMS 100 of FIG. 1. Example primary or tier-one storage device 214 includes Oracle Exadata storage used by PDBs. Example secondary or tier-two storage device 216 includes an older/cheaper version of tier-one Oracle Exadata storage and/or object-based storage. The object-based storage may be from the same or different cloud vendor. Example object-based storage may be provided by Amazon Web Services S3, Google Cloud Storage, IBM Cloud Object Storage, Azure Blob Storage, and Oracle Storage.

Network 202 broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 202 and the disclosure presumes that all elements of FIG. 2 are communicatively coupled via the network 202. The various elements depicted in FIG. 2 may also communicate with each other via direct communications links that are not depicted in FIG. 2 for purposes of explanation.

Monitoring and Archiving

A metric for determining whether a PDB is active or not is by checking whether there has been an inbound user connection to the PDB within a first period of time. If there has been no inbound user connection to the PDB within the first period of time, then the PDB is automatically removed from the cloud environment and archived to lower cost cloud storage. If a PDB has been archived for a second period of time, then the PDB is deleted from lower cost cloud storage.

Figure 3:
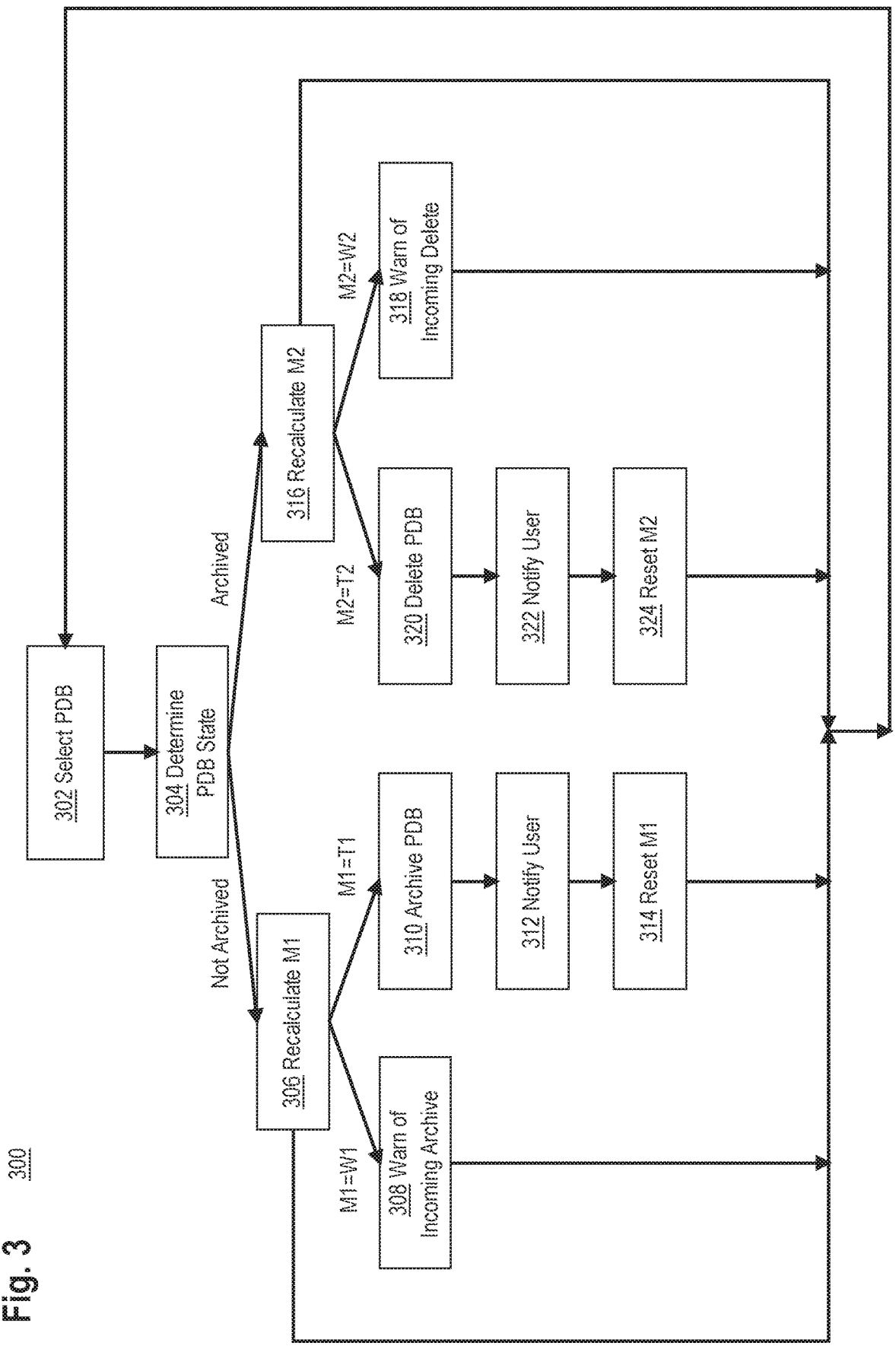
FIG. 3 illustrates an example inactivity check flow according to an embodiment of the present invention.

FIG. 3 illustrates an example inactivity check flow according to an embodiment of the present invention. FIG. 3 is discussed in with reference to FIG. 1 and/or FIG. 2. Flow 300 refers to the following thresholds:

M1 (per PDB): elapse time since last active connection to PDB. M1 is initialized to 0.

M2 (per PDB): Elapsed time since archival of PDB. M2 is initialized to 0.

T1 (global): Adjustable duration when to archive inactive PDB. T1 is adjustable based on load measured on CDB host.

T2 (global): Duration when to delete archived PDB. T2 may be adjustable.

W1 (global): Duration when to warn user about upcoming archival of inactive PDB.

W2 (global): Duration when to warn user about upcoming deletion of archived PDB.

The flow 300 begins at block 302, where a PDB from a plurality of PDBs is selected.

At block 304, the state of the PDB selected at block 302 is determined. A state may be archived or not archived. A PDB that is not archived is one that is plugged into a host CDB. In an embodiment, Exadata storage is used by the PDB and the host CDB. A PDB that is archived is one that is unplugged from a host CDB.

If the state of the PDB is determined at block 304 as not archived, then at block 306, elapsed time since the last active connection to the PDB (M1) is calculated. An active connection to the PDB may be over SQL Net or over HTTPS. It is noted that M1 is initially set to zero (0). If an active connection is detected, then the counter is reset to zero (0). If an active action is not detected, then the counter keeps running/counting.

When the elapsed time since the last active connection to the PDB is shorter than the threshold to provide an upcoming archival warning (M1<W1), no action is needed. In an embodiment, W1 may be two (2) days before T1, where T1 is the time to archive a PDB that has been determined to be inactive. In an embodiment, T1 may be seven (7) days.

When the elapsed time since the last active connection to the PDB has reached the threshold to provide an upcoming archival warning (M1=W1), at block 308, a warning or advanced notification is provided to a corresponding end user of an upcoming archive of the PDB. The warning may be displayed in a console user interface and/or communicated via email, text and/or other communication means.

When the elapsed time since the last active connection to the PDB has reached the threshold to archive (M1=T1), at block 310, the PDB is automatically archived. In an embodiment, the PDB is automatically archived by unplugging the PDB from the host CDB. A PDB descriptor, containing information about the names and full paths of tablespaces of the PDB, is generated. The PDB descriptor file may be formatted according to XML or JSON for example. The PDB descriptor and all data files for the PDB are combined into an archive file. The archive file is copied or otherwise transferred to low cost object storage (e.g., Amazon S3). All data files for the PDB are deleted from the host CDB. Block 310 frees up all CPU, ram, and expensive Exadata storage used by the PDB and the host CDB.

At block 312, a completion notification is provided. End user is notified of the archival of the PDB. In an embodiment, the archived PDB is visually shown as being stopped in a UI console. At block 314, M1 is reset to zero (0).

If the state of the PDB is determined at block 304 as archived, then at block 316, elapsed time since the PDB was archived (M2) is calculated. It is noted that M2 is initially set to zero (0) and may start running/counting upon the PDB being archived.

When the elapsed time since the PDB was archived is shorter than the threshold to provide an upcoming deletion warning (M2<W2), no action is needed. In an embodiment, W2 may be 14 days before T2, where T2 is the time to delete an archived PDB. In an embodiment, T2 may be 90 days (cumulative).

When the elapsed time since the PDB was archived has reached the threshold to provide an upcoming deletion warning (M2=W2), at block 318, a warning or advanced notification is provided to a corresponding end user of an upcoming deletion of the archived PDB. The warning may be displayed in a console user interface and/or communicated via email, text and/or other communication means.

When the elapsed time since the PDB was archived has reached the threshold to delete (M2=T2), at block 320, the archived PDB is automatically deleted. In an embodiment, the archived PDB is deleted from the low cost object storage. Block 320 frees up storage used by the PDB on the low cost object storage.

At block 322, a completion notification is provided. End user is notified of the deletion of the archived PDB. In an embodiment, when the archived PDB is deleted, all associated data are permanently lost (e.g., data not recoverable). At block 324, M2 is reset to zero (0).

In an embodiment, end user is unable to connect to an archived PDB; any request to the archived PDB will not be recognized. However, end user is able to restart an archived PDB, at any time up until the deletion operation (e.g., block 320) occurs, by activating a start button in a UI console or by making an equivalent API call. The restart operation may run the inverse of the archival process described above, resulting in a plugged-in and running PDB. In an embodiment, the archive file is imported to the host CDB and is decompressed to configure a PDB that is plugged into the host CDB.

The flow 300 is repeated for the next PDB. In an embodiment, the flow 300 is continuously run to monitor activity against each PDB.

Adjustable Thresholds

In an embodiment, as load on a CDB (e.g., number of PDBs) increases, an archival threshold (e.g., T1) may be shortened to more aggressively free up CDB resources by archiving inactive PDBs (e.g., PDBs with no recent connections) to low cost object storage at a faster pace. Conversely, as load on the CDB decreases, the archival threshold may be lengthened to archive inactive PDBs at a slower pace. The threshold may be manually tunable (e.g., ops team of service provider) or may be automated based on recurring automatic measurements of CDB load. T1 may be a sliding time window that represents the maximum allowed inactivity time before archival occurs.

Other thresholds, such as M1, M2, T2, W1, and W2, may also be tunable, either manually or automatically. For example, T2 may be a sliding time window that represents the maximum allowed inactivity time before unrecoverable deletion occurs.

In an embodiment, M1, M2, T1, T2, W1, and W2 may be intelligently configured for managing available hardware/software capacity and accommodating bursts of usage. Intelligently configuring M1, M2, T1, T2, W1, and W2 allows for host resources to be efficiently allocated based on current traffic (e.g., CDB load).

Example Method of Optimizing Resources

Figure 4:
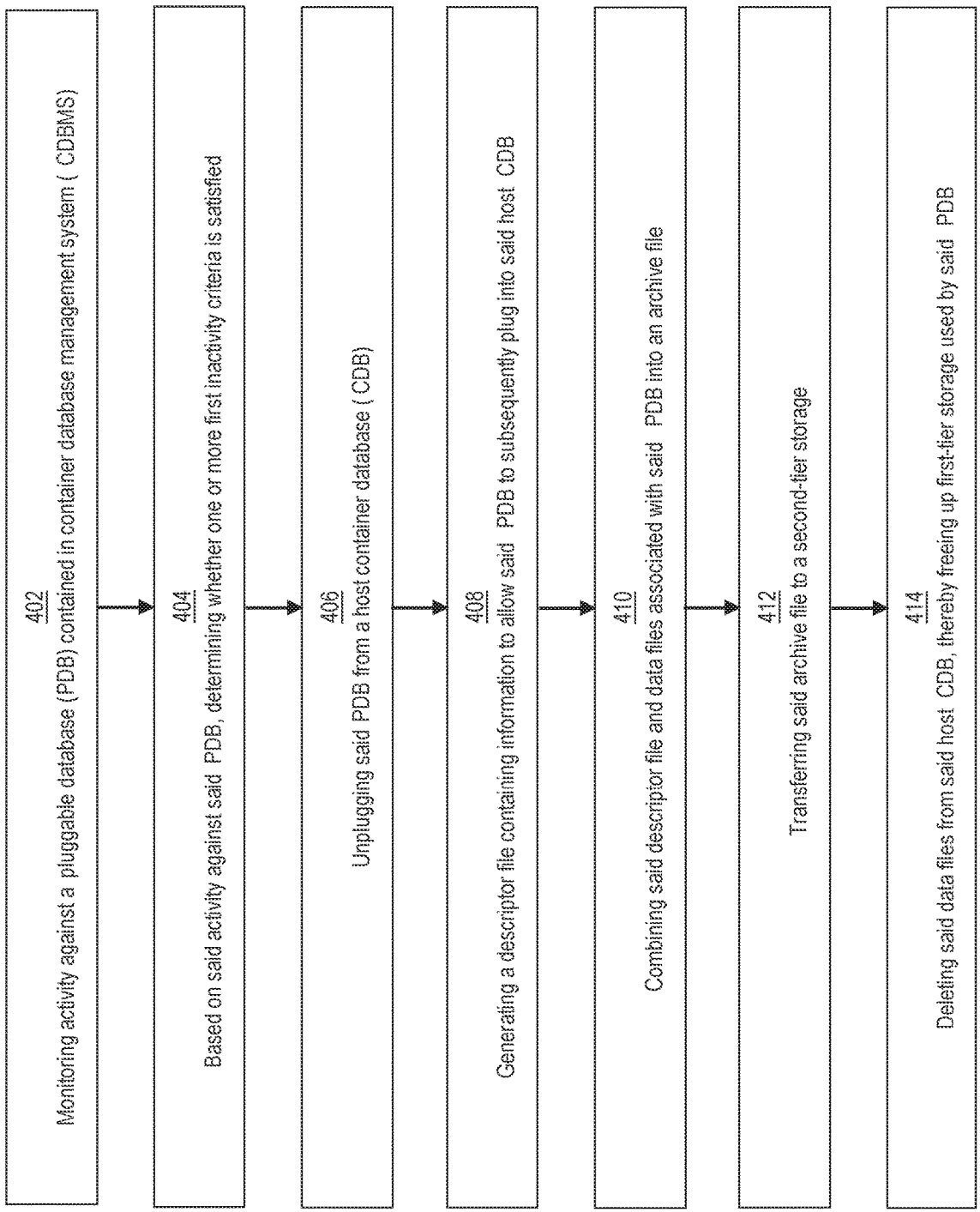
FIG. 4 illustrates a method of optimizing resources providing a cloud service according to an embodiment.

FIG. 4 illustrates a method of optimizing resources providing a cloud service according to an embodiment. Method 402 describes a generalized method of flow 300 of FIG. 3.

The method 402 begins at step 402, where activity against a pluggable database (PDB) is monitored. The PDB is contained in a container database management system (DBMS). In an embodiment, monitor 208 of FIG. 2 may continuously monitor (e.g., hourly, daily, weekly, etc.) the PDB to check for activities against the PDB.

At step 404, based on the activity against the PDB, it is determined whether one or more first inactivity criteria are satisfied. In an embodiment, the one or more first inactivity criteria comprise no active connection to the PDB for at least a first period of time (e.g., T1). For example, if it is determined that T1 has lapsed without since the last active connection to the PDB, then the PDB is considered inactive.

In an embodiment, the first period of time may be automatically adjusted based on load on a host CDB. For example, as load on the CDB (e.g., number of PDBs) increases, T1 may be shortened to more aggressively free up CDB resources by archiving inactive PDBs (e.g., PDBs with no recent connections) to low cost object storage at a faster pace. Conversely, as load on the CDB decreases, T1 may be lengthened to archive inactive PDBs at a slower pace.

In response to determining that the one or more first inactivity criteria are satisfied based on the activity, at step 406, the PDB is unplugged from a host container database (CDB). Inactive PDBs may be unplugged from the host CDB to conserve and/or reallocate resources used by the PDBs and the CDB.

At step 408, a descriptor file is generated. For example, when the PDB is unplugged from the host CDB, an PDB descriptor is generated. In an embodiment, the PDB descriptor contains information about the names and full paths of tablespaces. The PDB descriptor file may be formatted according to XML or JSON for example. In an embodiment, the PDB descriptor contains all required information to allow the PDB to subsequently "plug" into the same or different CDB.

At step 410, the descriptor file and data files associated with the PDB are combined into an archive file. Data files that contain the contents of the unplugged PDB, including schema, tables, and records are written into the archive file. An archive file may be a tar file, a compressed file, or an archive of any format that aggregates multiple files into one file, such as a library file.

At step 412, the archive file is copied or otherwise transferred to a tier-two storage.

At step 414, the data files are deleted from the CDB. Deleting the data files from the CDB frees up tier-one storage used by the PDB.

In an embodiment, the tier-one storage is a more expensive storage than the tier-two storage. Example tier-one storage includes Oracle Exadata storage devices used by the PDBs and the CDB. Example tier-two storage includes object storage provided by, for example, Amazon Web Services S3, Google Cloud Storage, IBM Cloud Object Storage, Azure Blob Storage, Oracle Storage, etc.

In an embodiment, archiver 210 of FIG. 2 generates a PDB descriptor for an unplugged PDB, combines the PDB descriptor and data files associated with the PDB into an archive file, and copies/transfers the archive file to low cost object storage.

In an embodiment, the method 400 may also include, based on the activity against the PDB, determining whether one or more second inactivity criteria are satisfied. The one or more second inactivity criteria may include the PDB being archived for at least a second period of time (e.g., T2). In response to determining that the one or more second inactivity criteria are satisfied based on the activity, the archive file is deleted from the tier-two storage. For example, archiver 210 may delete the archive file from the tier-two storage. Deleting the archive file from the tier-two storage frees up the tier-two storage used by the PDB.

In an embodiment, the method 400 may also include, based on the activity against the PDB, determining whether one or more restart criteria are satisfied. The one or more restart criteria may include a restart trigger after the archive file is transferred to the tier-two storage (e.g., at T1) but before the archive file is deleted from the tier-two storage (e.g., at T2). In response to determining that the one or more restart criteria are satisfied based on the activity, the archive file is imported to the host CDB. The archive file is uncompressed to configure another PDB that is plugged into the host CDB. For example, archiver 210 may retrieve the archive file, import the archive file to the host CDB, and decompress the archive file to configure a PDB.

In an embodiment, notifier 212 of FIG. 2 may generate multiple advanced notifications, such as in the form of messages (e.g., email, text, etc.) and UI alerts on client system 204 of FIG. 2, before any action is taken. For example, prior to the PDB being unplugged from the host CDB, the notifier 212 may generate an incoming archive warning. For another example, prior to the archive file being deleted from the low cost object storage, the notifier 212 may generate an incoming delete warning.

In an embodiment, notifier 212 of FIG. 2 may generate multiple completion notifications, such as in the form of messages and UI alerts on client system 204 of FIG. 2, after any action is successfully taken. For example, after the PDB is archived in low cost object storage, the notifier 212 may generate an archival notice. For another example, after the archive file is deleted from low cost object storage, the notifier 212 may generate a deletion notice. For another example, after the archive file has successfully configured a PDB, the notifier 212 may generate a restart notice.

Database Overview

Embodiments of the present invention are used in the context of database management systems (DBMSs). Therefore, a description of an example DBMS is provided.

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

Figure 5:
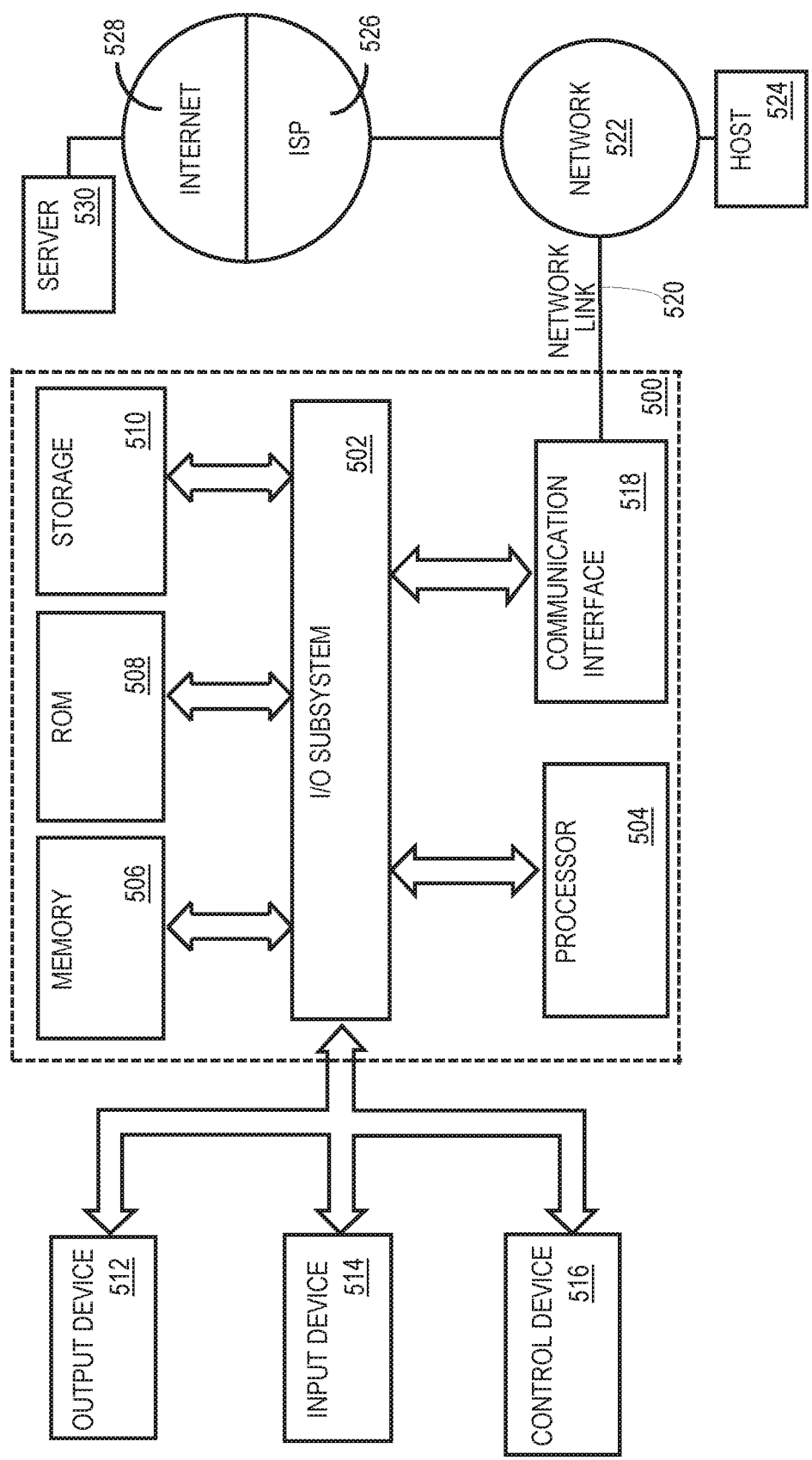
FIG. 5 illustrates a block diagram of a computing device in which the example embodiment(s) of the present invention may be embodiment.

Referring now to FIG. 5, it is a block diagram that illustrates a basic computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

Software Overview

Figure 6:
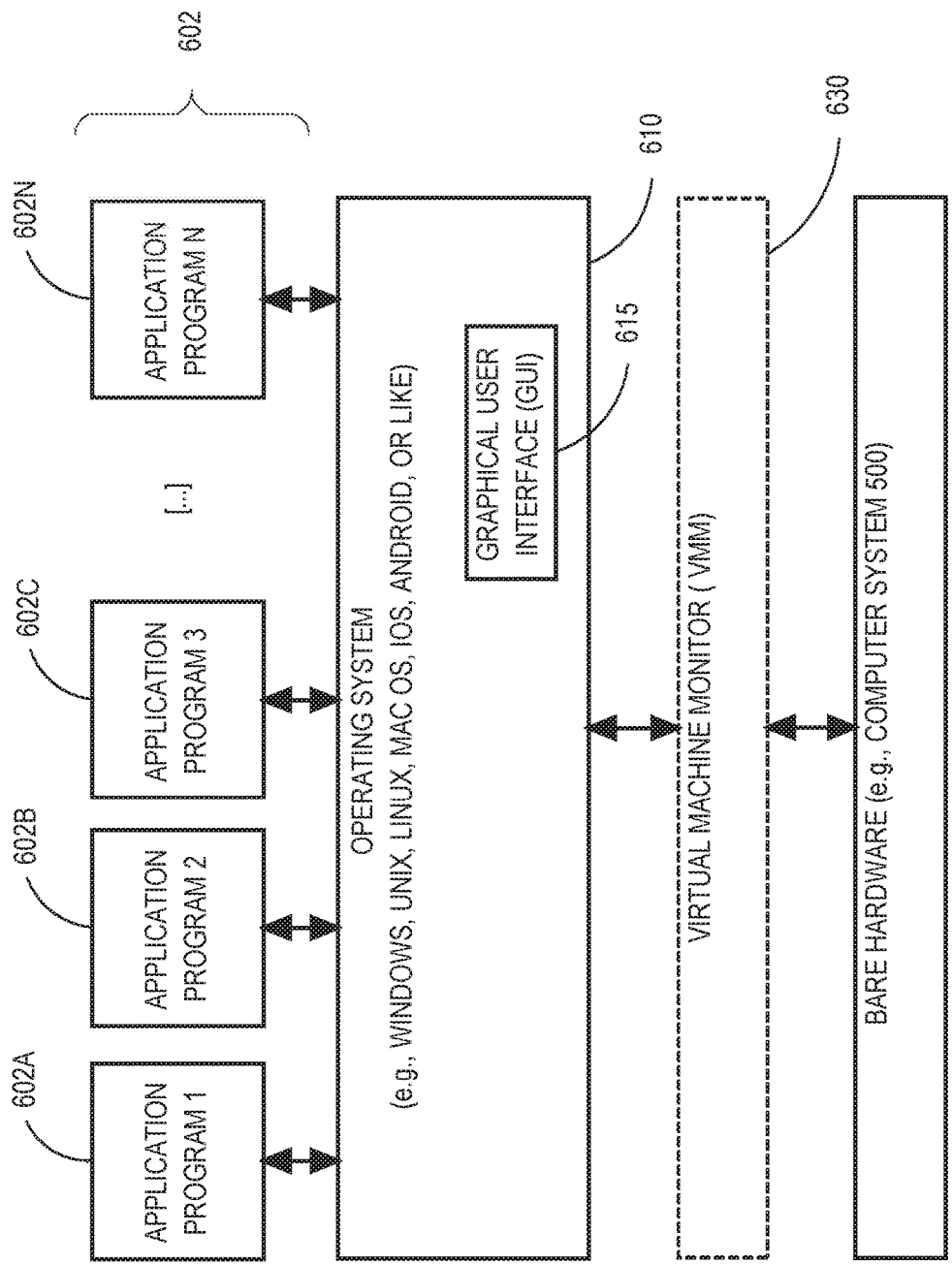
FIG. 6 illustrates a block diagram of a basic software system for controlling the operation of a computing device.

FIG. 6 is a block diagram of a basic software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
    monitoring activity against a pluggable database (PDB) contained in a container database management system (CDBMS), said CDBMS comprising a plurality of PDBs including said PDB;
    based on said activity against said PDB, determining whether one or more first inactivity criteria are satisfied;
    in response to determining that said one or more first inactivity criteria are satisfied based on said activity:
        unplugging said PDB from a host container database (CDB);
        generating a descriptor file containing information to allow said PDB to subsequently plug into said host CDB;
        combining said descriptor file and data files associated with said PDB into an archive file;
        transferring said archive file to a tier-two storage;
        deleting said data files from said host CDB, thereby freeing up tier-one storage used by said PDB;
    based on said activity against said PDB, determining whether one or more restart criteria are satisfied; and
    in response to determining that said one or more restart criteria are satisfied based on said activity:
        importing said archive file to said host CDB; and
        uncompressing said archive file to configure another PDB that is plugged into said host CDB.

2. The method of claim 1, wherein said one or more first inactivity criteria comprise no active connection to said PDB for at least a first period of time.

3. The method of claim 2, further causing automatically adjusted said first period of time based on CDB load.

4. The method of claim 1, wherein said tier-one storage is a more expensive storage than said tier-two storage.

5. The method of claim 1, further comprising, prior to unplugging said PDB from said host CDB, causing to generate an archival warning.

6. The method of claim 1, further comprising:
    based on said activity against said PDB, determining whether one or more second inactivity criteria are satisfied;
    in response to determining that said one or more second inactivity criteria are satisfied based on said activity:

deleting said archive file from said tier-two storage, thereby freeing up said tier-two storage used by said PDB.

7. The method of claim 6, wherein said one or more second inactivity criteria comprise said PDB being archived for at least a second period of time.

8. The method of claim 6, further comprising, prior to deleting said archive file, causing to generate a delete warning.

9. The method of claim 1, wherein said one or more restart criteria comprise receipt of a restart trigger after said archive file is transferred to said tier-two storage but before said archive file is deleted from said tier-two storage.

10. One or more non-transitory computer-readable storage media storing one or more sequences of program instructions which, when executed by one or more computing devices, cause:
   monitoring activity against a pluggable database (PDB) contained in a container database management system (CDBMS), said CDBMS comprising a plurality of PDBs including said PDB;
   based on said activity against said PDB, determining whether one or more first inactivity criteria are satisfied;
   in response to determining that said one or more first inactivity criteria are satisfied based on said activity:
      unplugging said PDB from a host container database (CDB);
      generating a descriptor file containing information to allow said PDB to subsequently plug into said host CDB;
      combining said descriptor file and data files associated with said PDB into an archive file;
      transferring said archive file to a tier-two storage;
      deleting said data files from said host CDB, thereby freeing up tier-one storage used by said PDB;
   based on said activity against said PDB, determining whether one or more restart criteria are satisfied; and
   in response to determining that said one or more restart criteria are satisfied based on said activity:
      importing said archive file to said host CDB; and
      uncompressing said archive file to configure another DB that is plugged into said host CDB.

11. The one or more non-transitory computer-readable storage media of claim 10, wherein said one or more first inactivity criteria comprise no active connection to said PDB for at least a first period of time.

12. The one or more non-transitory computer-readable storage media of claim 11, wherein said one or more sequences of said program instructions, which when executed by said one or more computing devices, further cause automatically adjusting said first period of time based on CDB load.

13. The one or more non-transitory computer-readable storage media of claim 10, wherein said tier-one storage is a more expensive storage than said tier-two storage.

14. The one or more non-transitory computer-readable storage media of claim 10, wherein said one or more sequences of said program instructions, which when executed by said one or more computing devices, further cause, prior to unplugging said PDB from said host CDB, causing to generate an archival warning.

15. The one or more non-transitory computer-readable storage media of claim 10, wherein said one or more sequences of said program instructions, which when executed by said one or more computing devices, further cause:
   based on said activity against said PDB, determining whether one or more second inactivity criteria are satisfied;
   in response to determining that said one or more second inactivity criteria are satisfied based on said activity:
      deleting said archive file from said tier-two storage, thereby freeing up said tier-two storage used by said PDB.

16. The one or more non-transitory computer-readable storage media of claim 15, wherein said one or more second inactivity criteria comprise said PDB being archived for at least a second period of time.

17. The one or more non-transitory computer-readable storage media of claim 15, wherein said one or more sequences of said program instructions, which when executed by said one or more computing devices, further cause, prior to deleting said archive file, causing to generate a delete warning.

18. The one or more non-transitory computer-readable storage media of claim 10, wherein said one or more restart criteria comprise receipt of a restart trigger after said archive file is transferred to said tier-two storage but before said archive file is deleted from said tier-two storage.

* * * * *